United States Patent [19]

Gagnon

[11] Patent Number: 5,107,342
[45] Date of Patent: Apr. 21, 1992

[54] SYSTEM AND A PROCESS FOR RECORDING CARTOGRAPHIC INFORMATION ON A VIDEODISK

[75] Inventor: Romain Gagnon, Brossard, Canada

[73] Assignee: Mosaic GL Inc., Laval, Canada

[21] Appl. No.: 442,118

[22] Filed: Nov. 28, 1989

[51] Int. Cl.⁵ .................... G11B 7/00; H04N 5/782
[52] U.S. Cl. .............................. 358/335; 358/342; 358/103
[58] Field of Search ............... 364/900, 521, 523, 200, 364/518; 358/335, 342, 103; 340/700; 360/32

[56] References Cited

U.S. PATENT DOCUMENTS 4,947,367  8/1990  Chang et al. ................... 364/900

Primary Examiner—Robert L. Richardson
Attorney, Agent, or Firm—Longacre & White

[57] ABSTRACT

The disclosure herein describes a system and a process for recording cartographic information on a videodisk; it comprises the steps of converting into digital raster format printed information displayed on geographic maps and charts; computer processing the converted information to create video frames; converting each raster frame into a video composite signal to form an analog frame; recording each analog frame onto an analog magnetic tape; and producing a videodisk containing the information obtain from the tape.

5 Claims, 2 Drawing Sheets

SYSTEM AND A PROCESS FOR RECORDING CARTOGRAPHIC INFORMATION ON A VIDEODISK

FIELD OF THE INVENTION

The present invention pertains to videodisk mapping and, more particularly, to a system and method for making a cartographic videodisk.

BACKGROUND OF THE INVENTION

The increasing popularity of geographic information systems for natural resources management, terrain analysis and intelligence analysis has resulted in the production of videodisks for representing topographical maps, hydrographic charts and the like.

Maps and charts on videodisks are now been used as an alternative for paper maps. This technology consists of a videodisk player, a video monitor and, optionally, a graphic overlay board which are coupled to a computer, allowing users to consult, index and manage a bank of natural resources, terrain or similar information.

The videodisk is a support for geographic information systems which answers to a precise need: the consultation and editing of modifiable geographically referenced information on a stable geographic background. Several software packages have been developed (for example, FULCRUM (trademark) by Interactive Television Company (ITC) or VIDEOMAP by U.S.A. Defence Mapping Agency (DMA)) in association with cartographic videodisks to carry out various consultation functions:

viewing of a chart starting from the name of a town or of a continent;
panoramic movement of the images;
display of geographical coordinates;
measurement of distance and travel;
overlay of data, images and text;
analysis of terrain and shapes;
impression of parts of map or charts.

The ITC process consists in capturing frames by means of a computer controlled 35 mm camera which is displaced step-by-step vertically in front of a horizontally moveable panel on which are mounted selected maps and/or charts. The captured photos are then put on a videodisk. The valid areas of each chart are cut and then adjacently pasted in a mosaic arrangement on the panel. Further, the camera is rotated so that the vertical central frame axis of the frame coincides with one of the geodesic meridian; thus the geodesic north is at the top of the frame. Simultaneously, the index and library files, which are necessary for the intelligent management of the images, are created.

This system, therefore, is entirely analog and mostly mechanical in concept. Thus, its use provides a considerable number of degradations and, also, a lack of flexibility. Finally, the numerous manual operations needed result in high costs.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

OBJECTS AND STATEMENT OF THE INVENTION

An object of the present invention is to provide an improved system and method for making cartographic videodisks while improving image quality and reducing labor costs.

The method of the present invention is accomplished with the use of a system which basically requires the following modules:
a module for digitizing maps or charts;
a module for processing the digitized data obtained;
a module for video recording the processed data on an analog videotape; and
a module for mastering a videodisk from the analog videotape.

Basically, this method consists in scanning printed copies of paper maps or charts to convert them into digital data, in computer processing the scanned data with a view to improve, cut and condition same and in storing the data thus treated on a videodisk by a video recording procedure.

One advantage of the method of the present invention is that the system for carrying it out is entirely electronic, from map reading to the creation of the master band which is used in for the subsequent videodisk mastering process. It thus requires less handling thereby noticeably reducing production costs.

Another advantage of the present method is that it includes a number of steps for the correction and the improvement of the collected cartographic data. Furthermore, these data are conditioned to avoid degradations and visual nuisances which are inherent to a composite television signal.

A further advantage is an increase in flexibility due to the fact that, for each type of map scale, an appropriate digital image processing may be defined. Also, a database of scanned maps can be easily created so that a new videodisk can be produced from previously digitized data at low cost.

DESCRIPTION OF PREFERRED EMBODIMENT

The first module converts the information shown on printed copies of paper geographic maps or charts into digital information under the raster format and stores this information on digital supports.

Figure 1:
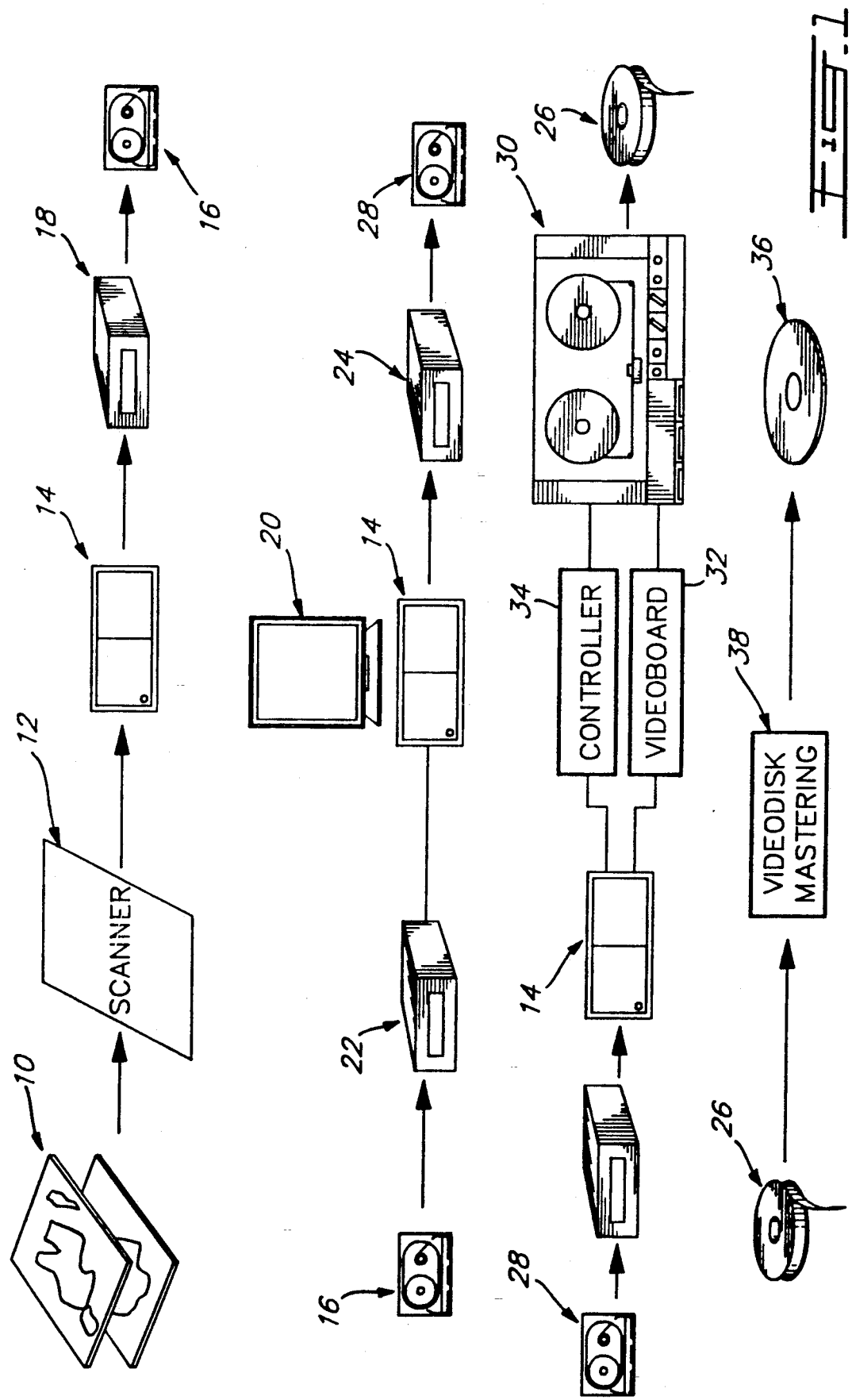
FIG. 1 is a block diagram illustrating the various steps of the method of the present invention.

Referring to FIG. 1, geographic maps or charts 10 are processed through a scanner 12; the digital data obtained from the scanner are stored by a computer 14 on a magnetic cartridge 16 by means of a tape-backup unit 18. The collected digital information must be identical to that appearing on the paper maps or charts. It is, therefore, important that the resolution of the scanner 12 be defined in accordance with the finest details which are present on the maps or charts. During scanning, the digitization is preferably in the order of 500 dots per inch; also, color digitization (24 bits per pixel or 256 grey levels per basic color) is desired. It has been found that a scanner, such as the OPTRONICS 4040 (trademark) includes the needed specifications to carry out this step.

Should the hereinunder described second module be geographically spaced from this first module or be stored for special archiving purposes, the information is stored on magnetic tapes having great capacity in order to permit its transportation. For example, the scanning of 160 maps provides digital information in the order of 83 gigabytes (GB). The use of 8 mm cartridges of capacity of 2.3 GB is satisfactory for this avalanche of information. Therefore, for 160 maps, 36 cartridges are required for the transportation of the information. The high speed of data transmission (a minimum of 256 Kbytes per second) is an important aspect of the tape back-up unit.

The second module consists in processing the digitized information collected from the first module with a view to cutting, improving and conditioning same.

Firstly, due to the dimensions of a map and the amount of information that it carries, it is impossible to entirely represent a map on a TV monitor without introducing an important loss of information. Consequently, a cutting of the map into small sections for viewing must be made. For example, the covering area per frame generally used for maps of 1:50,000 and 1:250,000 scales is 3"×2.25" with an overlap of 50% horizontally and 30% vertically between adjacent frames. This cutting produces about 280 frames per map. Frame rotation must therefore be accomplished in order to respect DMA specifications; it consists in locating the north of an image at the top of the screen.

Figure 2:
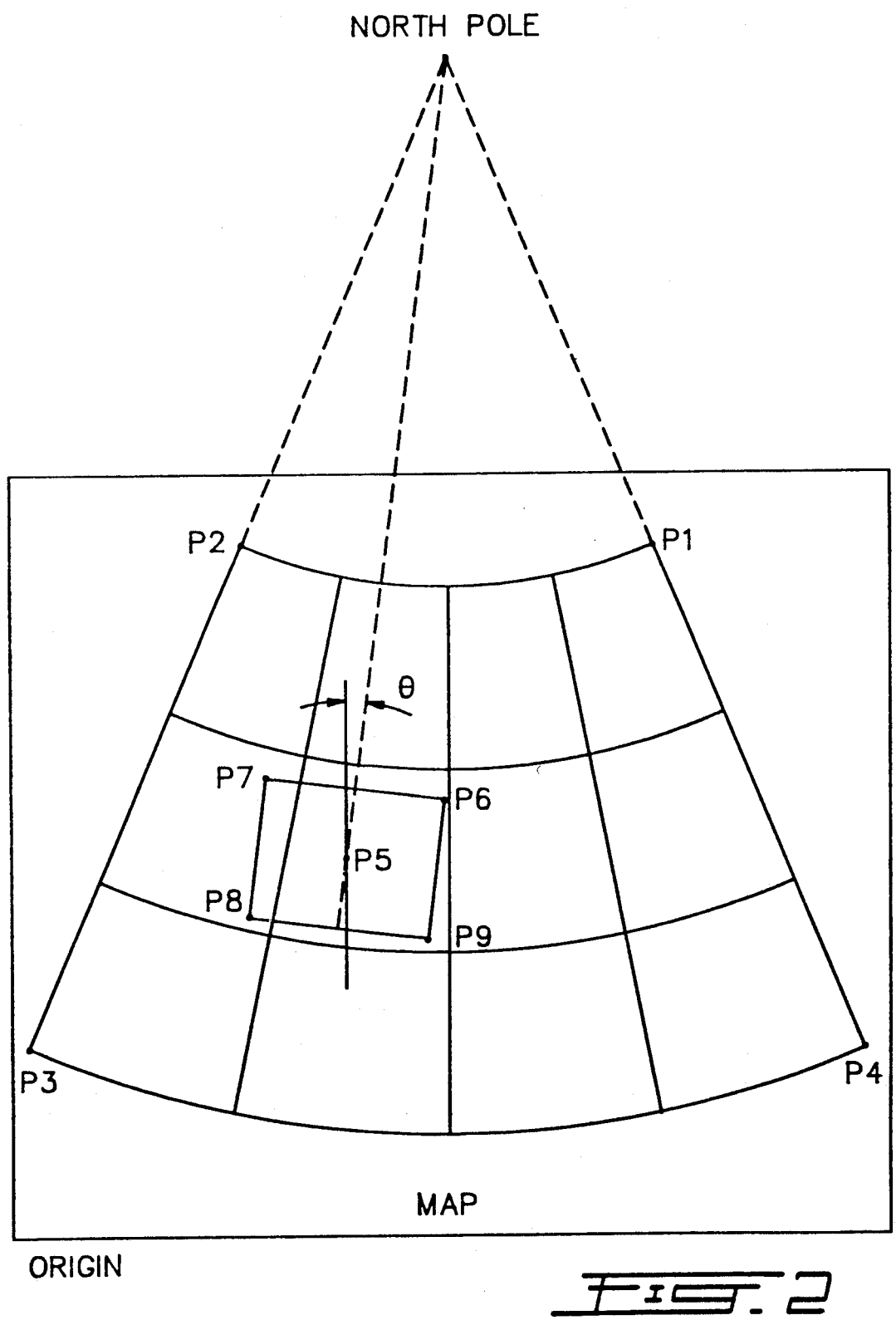
FIG. 2 is a typical map for explaining one step in the said steps.

To understand how translations and rotations are accomplished, consider FIG. 2 representing a typical map (Lambert conformal conic projection). The first step consists in determining a system of polar equations to locate any cartesian coordinate on the map from its geographic coordinate.

$X = Gain\_latitude * (Offset\_latitude - Latitude) * \sin(Gain\_longitude * (Offset\_longitude - Longitude)) + Offset\_X;$ $Y = -Gain\_latitude * (Offset\_latitude - Latitude) * \cos(Gain\_longitude(Offset\_longitude - Longitude)) + Offset\_Y;$ If the lower left corner is considered the origin, the X and Y coordinates are growing to the upper right corner.

The geographic and cartesian coordinates of the four corners (P1, P2, P3, P4) of the active area must be determined manually on the monitor 20; all the rest is done by computer. The cartesian coordinates of the North Pole (Offset\_X, Offset\_Y) can be determined easily being the intersection of the two straight lines (P2, P3) and (P1, P4).

The Gains and Offsets are the parameters of a linear transform between the geographic coordinates (Longitude, Latitude) and their polar cartesian counterparts (Radius, Angle).

The translations are done easily using these formulas:

$Next\_longitude = Longitude - (Step\_X * 180/Pi) / Gain\_latitude * (Offset\_latitude - Latitude) * Gain\_longitude);$ or $Next\_latitude = Latitude + step\_Y / Gain\_latitude;$ Each frame is then rotated by a angle 0 so that the frame sides (P7, P8) and (P6, P9) become parallel to the meridian going through the center of the frame (P5).

Each time a frame is cut, a related record is created and added to an index file. That file is supplied on a diskette for each videodisk produced. The index and library files are a geographic description of the videodisk content.

Secondly, the processing of the digitized information collected includes color claustering and contrast enhancement in order to improve image quality. State-of-the art digital image processing techniques are used to minimize the flickering effect of NTSC signal and to provide an efficient compression of storage requirements.

Thirdly, the information must be conditioned such that it be in a format which is compatible with that of the digital video board, as described hereinbelow. Principally, this conditioning consists in sub-sampling the information since the digital image processing requires an over-sampling of maps. For example, a map having a 1:50 000 scale and a surface of 55 cm × 78 cm represents, before reduction, an amount of information which is equal to 171.6 millions of pixels or 514.8 MBytes (3 bytes per pixel). If the digital video board format is 756 × 486 pixels (1 byte per pixel), the amount of information is reduced to 103 MBytes per map. Therefore, the number of 36 cartridges needed for 160 digital maps at input is reduced to 8 cartridges at the output.

Since image processing of geographic maps requires high processing speed and a considerable amount of storage space, one type of computer 14 which is suitable, is the SUN SPARC SERVER 330 (trademark) having a RISC architecture. This micro-station 14 must be equipped with at least two tape-backup units 22 and 24 as peripherals. The first player 22, located at the input, is used to feed digital data to the microstation 14 whereas the second player 24 stores map frames under there final format.

The present invention comprises a third module for recording the digital frames onto an analog videotape 26 as this is the most conventional method of providing data to videodisk manufacturers. At this stage of the process, all frames are under their final format and stored digitally on cartridges 28. The function of this module consists in converting each digital frame into an analog frame and in recording sequentially the master tape 26. Furthermore, since the number of frames to be converted and to be recorded is important, an automatic operational mode is required. One preferred manner of carrying out this step is to use a VTR (1"broadcast quality) 30 especially adapted for frame-by-frame recording and an RGB-NTSC encoder of high quality. As illustrated in FIG. 1, the micro-station 14 is equipped with two boards: a digital video board 32 allowing the conversion of a digital image into an analog NTSC video signal and a VTR controller 34 which allows the computer to supervise the operation of the VTR 30.

The last module consists in producing a videodisk 36 containing information on the master tape 26 through a conventional mastering process 38.

Although the invention has been described above with respect with one specific form, it will be evident to the person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. A process for recording in high resolution form printed cartographic information contained on charts and maps onto videotape, the process comprising the steps of:

scanning said printed cartographic information into digital raster format to form raster frames of said information;

converting each of said raster frames into a video composite signal in the form of an analog frame; and, recording each of said analog frames onto an analog magnetic tape.

2. A process for recording in high resolution form printed cartographic information contained on charts and maps onto a videodisk, the process comprising the steps of:

scanning said printed cartographic information into digital raster format to form raster frames of said information;

converting each of said raster frames into a video composite signal in the form of an analog frame;

recording each of said analog frames onto an analog magnetic tape; and, thereafter creating a videodisk from information obtained from said analog frames recorded on said analog magnetic tape.

3. A process for recording in high resolution form onto videotape printed cartographic information contained on charts and graphs, for later creation of a videodisk using the information recorded on said videotape, said process comprising the steps of:

scanning said printed cartographic information into digital raster format;

computer processing said scanned information to create video frames, said processing comprising cutting said scanned information into portions representing cartographic areas smaller than the total scanned cartographic area and creating raster frames corresponding to said smaller areas, digitally processing said raster frames to improve the video quality thereof, indexing and creating library files for each of said frames to indicate geographic coverage corresponding to each of said frames;

converting each of said raster frames into a video composite signal in the form of an analog frame; and, recording each of said analog frames onto an analog magnetic tape.

4. A process for recording in high resolution form onto videotape printed cartographic information contained on charts and graphs, and later creation of a videodisk using the information recorded on said videotape, said process comprising the steps of:

scanning said printed cartographic information into digital raster format;

computer processing said scanned information to create video frames, said processing comprising cutting said scanned information into portions representing cartographic areas smaller than the total scanned cartographic area and creating raster frames corresponding to said smaller areas, digitally processing said raster frames to improve the video quality thereof, indexing and creating library files for each of said frames to indicate geographic coverage corresponding to each of said frames;

converting each of said raster frames into a video composite signal in the form of an analog frame;

recording each of said analog frames onto an analog magnetic tape; and, creating a videodisk from information obtained from said analog frames recorded on said analog magnetic tape.

5. An apparatus for recording in high resolution form onto videotape printed cartographic information contained on charts and graphs, and later creation of a videodisk using the information recorded on said videotape, said apparatus comprising:

digital scanner means for scanning said printed cartographic information into digital raster format;

digital computer means for processing said scanned information to create video frames, said processing comprising cutting said scanned information into portions representing cartographic areas smaller than the total scanned cartographic area and creating raster frames corresponding to said smaller areas, digitally processing said raster frames to improve the video quality thereof, indexing and creating library files for each of said frames to indicate geographic coverage corresponding to each of said frames;

converter means for converting each of said raster frames into a video composite signal in the form of an analog frame;

video recorder means for recording each of said analog frames onto an analog magnetic tape; and, videodisk recorder means for creating a videodisk from information obtained from said analog frames recorded on said analog magnetic tape.

* * * * *